July 28, 1931.  G. C. THOMAS, JR  1,816,666
CABLE CONNECTER
Filed July 26, 1926
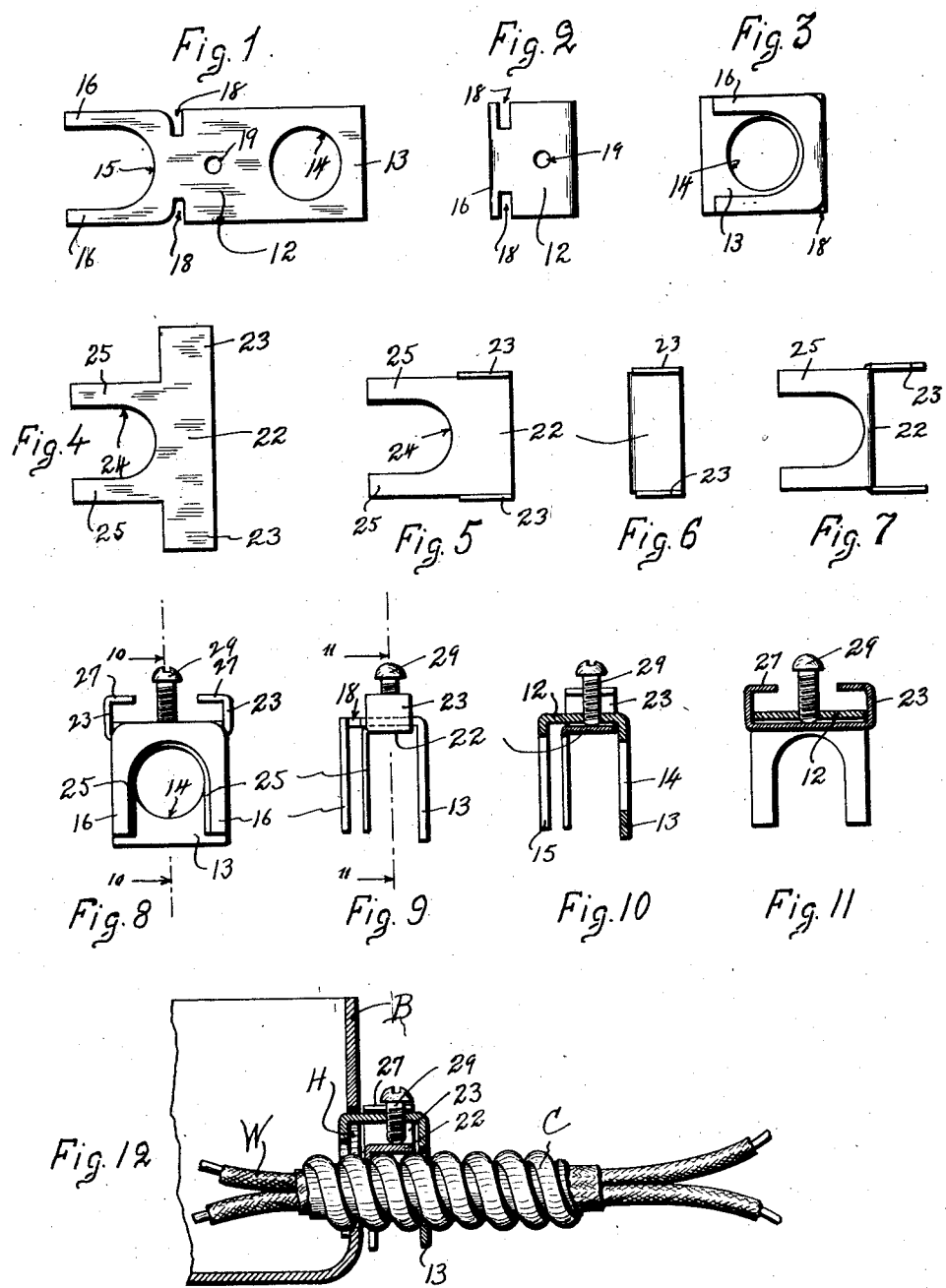
INVENTOR
George C. Thomas, Jr.
BY
ATTORNEYS Patented July 28, 1931

1,816,666

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,817.

This invention relates to cable box and connecting means and particularly to improved connecters for attaching cable to electric fixture boxes and the like.

An object of the invention is to produce an improved cable connecter of the type which leaves exposed a part of the box hole edge and which is capable of anchoring itself and a cable to said exposed part of a box hole edge without screw fastening means directly connected with or extended through the box; and to combine therewith improved box hole edge abutments by which the connecter anchors itself in a box hole.

A further object of the present invention is to combine an improved cable bearing clamp plate with the connecter and to provide means by which this cable clamp is movably carried on the connecter, and to provide operating means, on the outside of a box, which reacts from the stationary cable to positively seat and anchor the connecter to the box hole edge and to simultaneously grip the cable against the exposed box hole edge.

Other objects and improvements are set forth in the specification describing an example of the invention.

The accompanying drawings show an example of the invention serving to explain its principles, construction, and mode of application to an electric fixture box.

The first three figures illustrate the manner of constructing the improved connecter plate. Figure 1 is a plan view of the connecter plate blank, while Figure 2 is a top view of the connecter plate blank subjected to two parallel bending operations, and finally Figure 3 is an inside elevation of the completed connecter plate which in reality is of general U-shaped form when viewed in side elevation.

Figures 4 to 7 inclusive show the manner of constructing the improved cable bearing clamp plate. Figure 4 is a plan view of the cable clamp plate, while Figure 5 is a plan view thereof with its retaining arms bent in parallel relation. Figure 6 is a plan view of the cable clamp subjected to a transverse bending operation, while Figure 7 shows an end elevation of the completed cable clamp.

Figures 8 to 11 inclusive show views of the completely assembled connecter.

Figure 8 shows an inside end elevation of connecter while Figure 9 shows a side elevation.

Figures 10 and 11 respectively illustrate a longitudinal section and a transverse section of the connecter as taken on the section lines 10—10 and 11—11 of the former views.

Figure 12 shows a general assembly view of the connecter mounted in a box anchoring a cable mounted thereto.

An electric fixture box B is ordinarily provided with box holes H to receive the connecter and cable C and to attach the cable C to the box so that the wires W may be manipulated in the box to make electrical connections.

The connecter plate shown in the first three figures comprises a plate portion 12 which includes an end 13 having a cable passage 14 of any suitable form. The other end of the connecter plate 12 is made with a cable passage 15 defined by box wall abutment fork portion 16 or other suitable means. The cable passages or openings 14 and 15 are for the purpose of admitting the cable through the connecter.

Box hole edge anchorage notches 18 are formed in alignment in the connecter plate 12 between the plate portion 12 and box wall abutment fork portion 16. In other words the box hole edge anchorage notches 18 are made between the box wall abutment member 16 and the main connecter portion 12. A threaded screw hole 19 is provided in the connecter plate 12 adjacent the box hole edge anchorage notches 18.

The stamping shown in Figure 1 is subjected to two parallel bending operations to produce a connecter plate as illustrated in Figures 2 and 3 and which is substantially U-shaped in side elevation. The box hole edge anchorage notches 18 have one side thereof defined by the inner face of the box wall abutment member 16 so that the notches 18 register with the box hole edge H while the inner face of said member 16 lies in close contact with the box wall.

The connecter plate 12 is made suitable in size to fit through the box hole H and have its anchorage notches 18 register with the box hole edge and at the same time leave exposed a part of said box hole edge. To this end the plate 12 may to advantage be made slightly narrower than the diameter of the box hole so that it will readily fit thereinto. Either that, or one portion of the connecter plate, which stands to one side or the other of the notches 18, is made small enough to fit into the box hole.

Coming now to a description of the cable bearing clamp plate shown in Figures 4 to 7 inclusive there is illustrated a bearing plate portion 22 with outstanding arms 23 which are designed to retain the cable clamp 22 in movable relation on the connecter plate 12. The cable clamp 22 may also be provided with a cable passage 24 defined by a member 25 in the form of a fork or other suitable means. The cable clamp 22 is fashioned into ultimate form as illustrated in Figure 7 by bending the arms 23 upwardly at right angles to the bearing plate 22 and by bending the prongs 25 downwardly at right angles to bearing plate 22.

A completed connecter plate shown in Figure 3 together with a cable clamp shown in Figure 7 are placed together as shown in the assembly views and the upper ends of the arms 23 are bent over in the form of fingers 27 by which to cause said arms and fingers to embrace the outer parallel edges of the connecter plate 12 to hold the two main parts together in movable relation. The cable C passes through the cable passages 24, 14 and 15, and thus the connecter parts embrace the cable in an effective way.

A screw 29, or other suitable operating means, is mounted in the screw hole 19 and is directed toward the bearing clamp plate 22 which comes in contact with the cable C and the screw end bears directly against the cable clamp 22 to prevent the screw from directly engaging the cable. The screw 29 is therefore mounted upon the connecter plate 12 so that its end engages the bearing clamp plate between the retaining arms 23 and as the screw is run down against the cable clamp 22 and forcing it outward from the connecter plate the retaining arms 23 move along the edge of the connecter plate 12. The fork formed by members 25 on the bearing clamp plate 22 also bear against the side of the cable as the bearing clamp plate is forced outwardly by the screw. Therefore the bearing clamp plate 22 is guided in its movement by the fork forming members 25 bearing against the cable and by the sides 23 of the fingers 27 bearing against the connecter plate.

The fingers 27 in addition to holding the bearing clamp plate 22 in movable relation with the connecter plate 12 also serve as stops limiting the outward movement of the bearing clamp plate when the fingers engage the connecter plate.

In the use of the connecter the screw 29 is backed out or unscrewed to permit the cable clamp 22 to be moved up in close relation to the connecter plate 12. The connecter is placed in the box hole H with the anchorage notches 18 in registry with the box wall or edge of the box hole. Thus the connecter seats and anchors itself to the box hole edge and at the same time leaves a large part of the box hole edge exposed directly to the cable C placed therein. The box wall abutment fork 16 lies closely in engagement with the inner face of the box wall B and thus the connecter stands outwardly a short distance from the outside of the box wall, the screw being outside the box.

The screw is now run down against the cable clamp 22 and thus pressure is subjected to the cable C bearing it laterally with respect to the box hole axis against the exposed box hole edge and simultaneously the reaction of the screw positively seats the connecter anchorage notches 18 in tight relation with the box hole edge.

What I claim is:

1. A connecter comprising two main plate parts and operating means, and embodying a connecter plate provided with box hole edge anchorage notches, including an inside box wall abutment plate to one side of the notches, a screw operating means as aforesaid mounted in the connecter plate on the other side of the notches and adjacent the notches; and a cable clamp including a bearing plate under the screw, including arms which embrace the edge of the connecter plate and fingers bent over the connecter plate to hold the two parts in movable relation.

2. A connecter comprising a U-shaped connecter plate provided with box hole edge anchorage notches, an inside box wall abutment adjacent the notches and an end having a cable passage therethrough forming the U-shaped connecter plate, a screw mounted in the connecter plate between and parallel to the legs of the U-shaped plate and adjacent the notches; a cable clamp comprising a bearing plate in line with the screw and embraced in the U-shaped plate, outstanding arms and a fork defining a cable passage, the arms bent at right angles to the bearing plate, the fork also bent at right angles to the bearing plate and in opposite direction to the arms, the arms including fingers bent over the connecter plate to hold the cable clamp movably on the connecter plate.

In testimony whereof I affix my signature.

GEORGE C. THOMAS, Jr.